April 24, 1956 C. W. HANSELL 2,743,354

FREQUENCY SHIFT SIGNALLING

Filed July 27, 1951 2 Sheets-Sheet 1

INVENTOR
Clarence W. Hansell
BY
Charles H. Brown
ATTORNEY

INVENTOR
Clarence W. Hansell
BY
Charles H. Brown
ATTORNEY 2,743,354

FREQUENCY SHIFT SIGNALLING

Clarence W. Hansell, Port Jefferson, N. Y., assignor to Radio Corporation of America, a corporation of Delaware Application July 27, 1951, Serial No. 238,854

The terminal 15 years of the term of the patent to be granted has been disclaimed 5 Claims. (Cl. 250—8)

The present invention relates to communication receiver systems, and particularly concerns an improved frequency shift type radio receiver having means for reducing the undesirable effects of multipath transmission signals received from a remote transmitter.

In long distance radio communication via the ionosphere it has been found that waves from the transmitting antenna are picked up by the receiving antenna after travelling over different paths of different length. It is not uncommon, because of this, for waves over the shortest and longest significant paths, which have left the transmitter at the same time, to arrive at the receiver at times which differ by as much as several milli-seconds. This causese a distortion of the received signals, the seriousness of which increases as it is attempted to increase the keying speed of a transmitted telegraph signal. Generally, the multipath distortion has made it impractical in regular commercial service to utilize keying speeds exceeding about 250 words per minute, or 100 dot intervals per second, in transoceanic short wave radio communication.

The effect of multipath transmission upon frequency shift keyed telegraph signals for a simplified case have been illustrated in Fig. 1. In these diagrams of Fig. 1, curves "*a*" and "*b*" represent the D. C. output current from the demodulator of a frequency shift telegraph receiver, representing a frequency shift signal coming in over two paths, "*a*" and "*b*" respectively, the mark frequency being represented by M and the space frequency by S. In these curves, signal carrier frequency is plotted against time. The signal over path "*b*" is assumed, and indicated, to have arrived 2 milliseconds later than the signal over path "*a*." This is indicated by the scale at the bottom of Fig. 1.

Both the path "*a*" and the path "*b*" signals are present in the receiver, one or the other being the stronger depending on momentary conditions of the two transmission paths. Moreover, in the receiver both signals enter the current amplitude limiter which precedes the discriminator, detector, gating tubes and so forth. During the indicated time intervals 0 to 2 and 6 to 8 milliseconds, both mark and space frequencies are present in the limiter input. When the path "*a*" signal is slightly stronger than the path "*b*" signal, the time frequency plot of the signal at the limiter output is as shown in curve "*c*." When the signal on path "*b*" is a little stronger than the signal on path "*a*," the signal at the limiter output is as represented in curve "*d*." This is because the beat frequency between the two signals may be considered to modulate, in the limiter, the stronger signal, as pointed out in Peterson, U. S. Patent No. 2,246,184 and my U. S. Patent No. 2,388,053. The alternating current representing the signal on path "*b*" modulates the phase or frequency of the stronger alternating current on the path "*a*" during the time 0 to 2 milliseconds so that the limiter output varies in frequency as illustrated in curve "*c*." The limiter action removes any amplitude variations in the signal but it cannot remove the phase or frequency modulation part of the beat. The phase or frequency modulation also takes place during the time 6 to 8 milliseconds. If the signal current whose frequency variations are illustrated by "*b*," instead of that as illustrated by "*a*" should become the strongest received current then modulation of the signal on path "*b*" takes place during these same times as illustrated in curve "*d*."

The limiter output is usually passed in sequence through a discriminator, a rectifier, and a low-pass filter. The output of the low pass filter is represented by curves "*g*" and "*h*." Curve "*g*" represents the condition in which the path "*a*" signal is stronger and curve "*h*" represents the condition in which the path "*b*" is the stronger. The output of the low pass filter actuates the trigger circuit which, in turn, controls the tone keyer. The trigger operates when the output of the low pass filter reaches a value of about 25 percent short of the mark or space operating voltage, that is, 25 percent less than the extreme voltage swing in either direction. This results in a tone keyer output represented by envelope traces as indicated in curves "*j*" and "*k*." The envelope of curve "*j*" is the output when the path "*a*" signal is the stronger, and the envelope of line "*k*" is the output when the signal of path "*b*" is the stronger. The timing of lines "*j*" and "*k*" envelopes differ by 2 milliseconds in the example given. The time jumping of the signal position, as different paths dominate over a short period of time, is a serious limitation in keying speed and reliability of operating, particularly when it is attempted to use frequency shift keying in conjunction with time division multiplexing in transoceanic radio communications. Of course, the same problem exists in any communications system, including wire communications, where the multipath phenomenon exists.

An object of my invention is to reduce or eliminate the effects of multipath transmission on the recorded signal present in any communication system.

Another object is to increase the speed and reliability of a radio communications system employing diversity reception by adding relatively inexpensive apparatus to existing equipment to minimize the effects of multipath transmission.

These objects are accomplished by employing the phase modulation beats between currents of different frequencies coming in over paths of different time delay to produce a new component of signal current which when added to that which normally appears in the output from a frequency shift type of receiver results in a final receiver output current which is relatively stable in time position. The alternating current (A. C.) ripple voltage, corresponding to the modulating beats, superimposed on the signal currents in the output of the receivers is utilized. The portion of the ripple voltage which extends above or below the range of signal voltage is limited or clipped off to produce a resultant which is then combined with the original D. C. signal currents to give the new signal. A limiter-rectifier circuit comprising two properly biased signal plus-minus limiter diodes in a suitable circuit arrangement inserted between the demodulator and low pass filter of the receiving system provide the relatively stable time positioned signals.

Other objects, features and advantages will appear in the subsequent detailed description which is accompanied by drawings, wherein.

Figure 1:
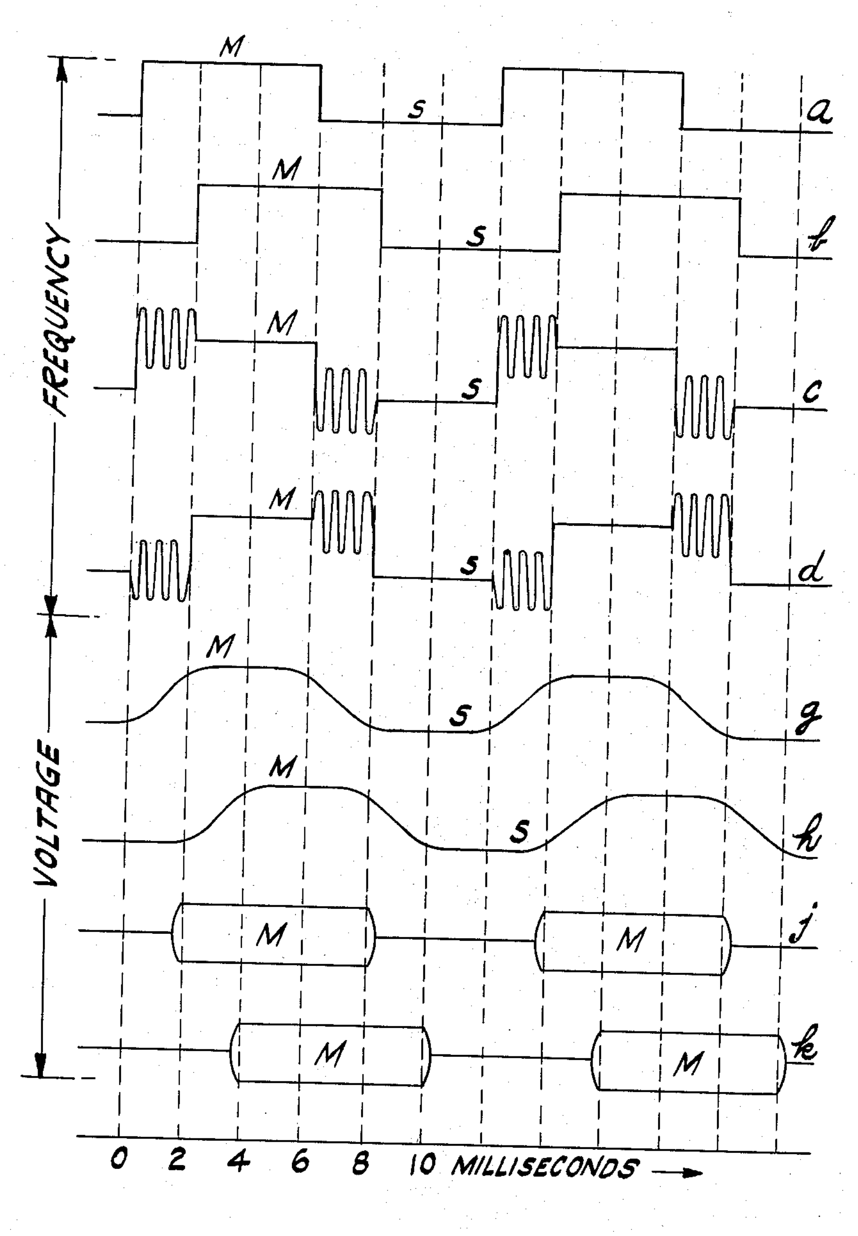
Fig. 1 illustrates by curves the manner in which multipath transmission acts in a frequency shift receiver to cause distortion in the recorded signals as explained above.

The invention is hereinafter described by way of example only, in connection with the system shown in Fig. 3.

Two frequency shift radio receivers 2 and 4 are each coupled respectively to separate antennas 6 and 8 geographically spaced to provide for diversity reception. The input of a diversity switcher 10 is coupled to the output of each of the receivers 2 and 4 and selects the output of the receiver having the stronger input signal, as disclosed in Peterson et al. U. S. Patent No. 2,494,309. Each of the receivers 2 and 4 includes an amplitude limiter and also a demodulator or detector, as illustrated in the aforesaid Patent No. 2,494,309. The output of the diversity switcher 10 which contains the limited and demodulated signal of keyed D. C. is coupled to a low pass filter and integrating circuit 12, shown in the upper right dash box, by an impedance matching network 14, shown in the upper left dash box, composed of three impedance matching resistors 16, 18 and 20 in series, and a parallel impedance matching resistor 22 coupled from the junction 24 of the second and third resistors 18 and 20 to ground. The first and second impedance matching resistors 16 and 18 are variable. The second impedance matching resistor 18 is shunted by a ripple passing condenser 21 having a low reactance to the ripple frequency which is superimposed on the D. C. output of the diversity switcher 10 when two input signals of different frequencies exist in the receiver system simultaneously. A limiter-rectifier circuit 26, shown in the lower dash box, including plus and minus limiter diodes 28 and 30 coupled to the impedance matching network 14, limits the signal voltage to a predetermined range, and also provides the rectified ripple voltage to be added to the D. C. signal. The plus limiter diode 28, having a plate 27 and cathode 29, is utilized to by-pass portions of signal having an amplitude greater than a predetermined signal range to ground. The plate 27 of the plus limiter diode 28 is connected to the junction 24, and the cathode 29 of said plus limiter diode 28 is connected to ground. The minus limiter diode 30, having a plate 31 and cathode 33, is utilized to by-pass any input signal to the diode 30 having a voltage amplitude of less than the predetermined signal range. The cathode 33 of said minus limiter diode 30 is connected to the said junction 24 and the plate 31 is connected to a negative bias source 32. A tone keyer 34, of the type disclosed in Peterson U. S. Patent No. 2,237,631, is coupled to the output of the low pass filter 12. The signal output 36 of the tone keyer 34 is utilized to operate remote recording devices, not shown.

Figure 3:
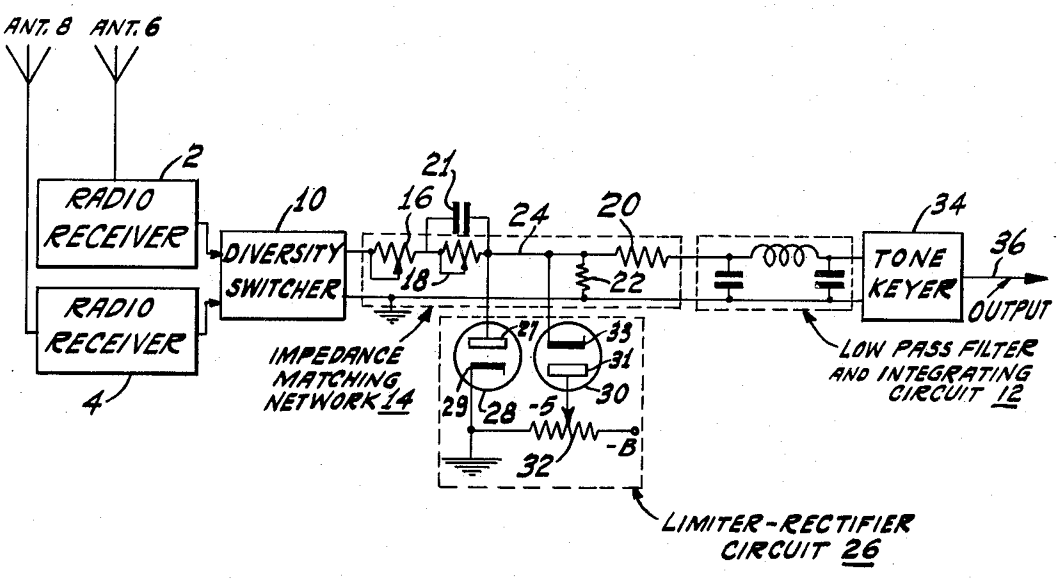
Fig. 3 illustrates a diversity frequency shift receiver system embodying my invention.

A description of the operation of the system shown in Fig. 3 follows:

When, because of multipath communication, two signals of different frequency corresponding to the mark and space signal frequencies are simultaneously received by either of the two receivers 2 and 4, the stronger signal will dominate the weaker, and the beat frequency between the two signals will modulate the stronger of the two signals. This modulation takes the form of both amplitude and frequency modulation. Since one of the functions of the limiter in a frequency shift radio receiver of the aforementioned type is to remove amplitude variations, only the phase and frequency modulation will remain. This modulation will appear in the D. C. output of the diversity switcher 10 as a ripple, on the signal corresponding to the dominant frequency input into the receiver. If, when the two frequencies are received simultaneously, the marking frequency is dominant, the wave form in the output of the diversity switcher 10 will appear as in line "*c*" of Fig. 1. If, on the other hand, the spacing frequency is dominant, then the output of the diversity switcher will appear in the form of the signal shown in line "*a*" of Fig. 1. Since the effects of the multipath phenonenon are such that the domineering signal at one time may not be the domineering signal a few milliseconds later, the result is time jumping as explained above.

In other words, the D. C. currents in the output of the diversity switcher 10, which correspond to mark and space signals, may jump in position over a short period of time thereby making accurate operation of the record ing instruments difficult.

Figure 2:
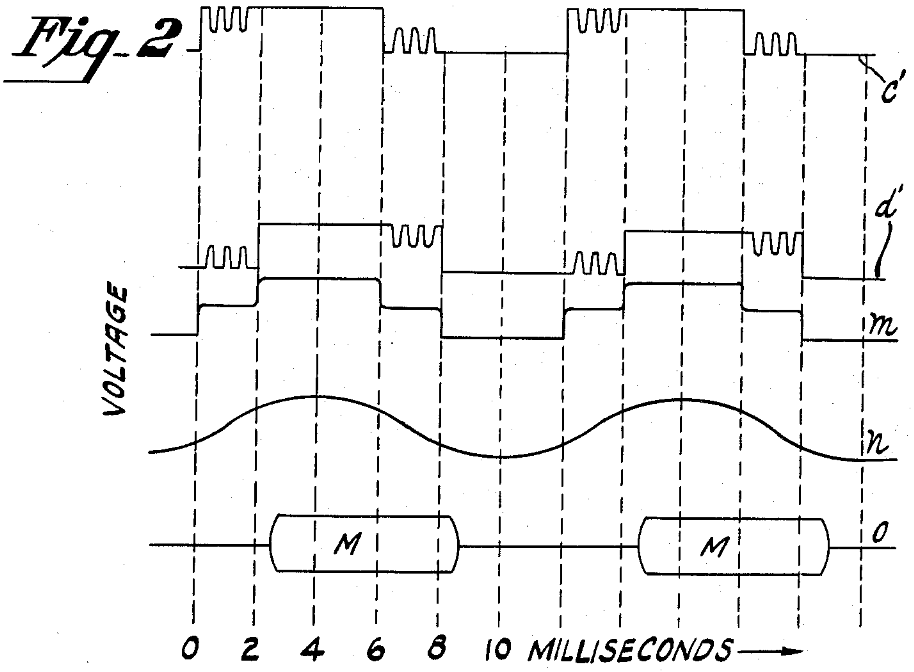
Fig. 2 illustrates by curves the manner in which the effects of multipath transmission are reduced so that the receiver output will be undistorted.

To reduce the effects of multipath transmission and consequent time jumping, the limiter-rectifier 26 coupled to the impedance matching network 14 is employed to form a new signal stable in time position. Assuming that the D. C. keying potential range which will properly operate the tone keyer 34 is from 0 to −5 volts, that is, 0 volts corresponding to the space frequency input into the receiver and −5 volts corresponding to the mark frequency input into the receiver, the two limiter diodes 28 and 30 of the limiter rectifier 26 will limit the input signal into the tone keyer 34 to this range. In Figs. 1 and 2, the mark frequency voltage (which is actually negative with respect to the space frequency voltage) is shown above (which is normally considered to be the positive direction) the space frequency voltage. However, this has been done only for the sake of convenience and makes no material difference in the explanation. Referring to the plus limiter diode 28, since its plate 27 is connected to the junction 24, any signal voltage having a positive value greater than 0 at the junction 24 will cause the plus limiter diode 28 to conduct, by-passing that portion of the signal to ground. Similarly, any signal voltage having an amplitude of less than −5 volts will cause the minus limiter diode 30 to conduct, limiting that portion of the signal range, since the plate voltage of the minus limiter diode is −5 volts as determined by the negative bias source 32. The ripple passing condenser 21 in parallel with the second impedance matching resistor 18 functions to pass the ripple frequency to the limiter diodes, said condenser 21 having a relatively low reactance at the ripple frequency, but a high reactance at the keying frequency. Consequently, by properly adjusting the first and second series matching resistors 16 and 18, the proportion of ripple frequency voltage to normal undistorted voltage can be adjusted. Since this ripple frequency is in the form of A. C., the limiter diodes 28 and 30 will operate in effect to clip off half-cycles of the ripple. Therefore, part of the ripple voltage is converted to pulsating D. C., the average of which is effectively added to the undistorted D. C. signal voltage to give a new signal. For example, if the marking frequency signal is dominant as in line "*c*" of Fig. 1, the signal is converted to that of line "*c'*" of Fig. 2. If the spacing frequency signal is dominant as in line "*d*" of Fig. 1, the signal is converted to that of line "*d'*" of Fig. 2. The variable series impedance resistors 18 and 16 are adjusted so that the ratio of clipped ripple voltage to the normal D. C. signal voltage will give the waveform substantially as indicated in line "*m*" wherein said waveform is the average of each of the waveforms in lines "*c'*" and "*d'*".

After the signal in the output of the diversity switcher 10 is limited and clipped by the limiter-rectifier 26, the signal passes through the low pass filter and integrating circuit 12. The signal is then in the form as indicated in line "*n*" of Fig. 2. Therefore, when the two signals of the example are present simultaneously, and have strengths not greatly different, in the receiver input, the average voltage input to the tone keyer 34 crosses the center line at a nearly constant timing irrespective of which frequency signal is dominant. The output of the tone keyer 34 will appear as on line "*o*" of Fig. 2, the mark envelopes being midway in position between the mark envelopes, spaced two milliseconds apart, resulting when path "*a*" or path "*b*," respectively, is stronger, as indicated on lines "*j*" and "*k*" of Fig. 1. Consequently, in this case, the time jumping of the signals in the output of the tone keyer 34 resulting from first one and then the other of the received marking and spacing waves becoming slightly the stronger is substantially eliminated. It now requires large differences in strength of marking and spacing wave currents to produce the maximum error in timing and, as the marking and spacing currents vary in relative strengths the timing variation varies smoothly with the variation in relative amplitudes. This smooth variation is far less troublesome than sudden jumps in timing experienced before.

In radio communication via the ionosphere, conditions as simple as those described seldom exist. Instead there are often currents arriving over as many as seven or more prominent paths, and the fact that the currents over each path vary continually in strength suggests that each prominent path may be made up of two or more component paths of somewhat different lengths. However, in spite of the complexity of multipath conditions encountered in practice, the nature of the phenomenon is as illustrated and the invention substantially reduces the effects of multipath transmission.

An advantage of the invention lies in the simplicity of the system provided for minimizing the effects of the multipath problem.

It is to be also understood that this invention is not restricted to diversity reception, or even to radio reception, but can be used in any communication system where the multipath problem exists.

What is claimed is:

1. Apparatus for reducing the effects of multiple wave paths in a frequency shift keying radio system receptive of frequencies corresponding to mark and space signals comprising a receiver means, an antenna connected to said receiver means, said receiver means at times receiving said mark and space signals simultaneously because of multiple wave path delay to produce a beat frequency signal which modulates the stronger of the two input signals present, said receiver means having a two-terminal output, the signal output of said receiver means being keyed direct current modulated by any beat frequency signal present to produce a ripple frequency superimposed on the keyed direct current output, said keyed direct current signal varying in position to produce time jumping of the mark and space positions, said direct current signal output having a predetermined signal voltage range, translating means to convert the keyed direct current to corresponding intelligence, said translating means having a two-terminal input, first, second and third impedance matching resistors in series with each other and connecting one terminal of the output of the said receiver to one terminal of the input of the said translating means, said first and second impedance matching resistors being variable, a ground connection, the remaining output terminal of the said receiver means being connected to said ground, the remaining input terminal of said translating means being connected to said ground, a ripple passing condenser connected in parallel with the said second impedance matching resistor, said ripple passing condenser having a low reactance to the ripple frequency, a plus limiter diode, said plus limiter diode having an anode and a cathode, said plus limiter diode anode being connected to the junction of said second and third impedance matching resistors, said plus limiter diode cathode being connected to ground, a source of variable negative voltage, a minus limiter diode, said minue limiter diode having an anode and a cathode, said minus limiter diode cathode being connected to said junction of said second and third impedance matching resistors, said minus limiter diode anode being connected to said source of variable negative voltage, a parallel impedance matching resistor connected between the said junction of the said second and third impedance matching resistors and ground to complete the impedance matching network comprising the first, second, and third impedance matching resistors and said parallel impedance matching resistor to match the said receiver means to the said translating means, said first and second impedance matching resistors being adjusted with respect to the ripple passing condenser so that a substantial portion of the ripple will appear across the plus and minus limiter diodes, said diodes operating to limit the portion of the ripple above and below the predetermined signal voltage range to produce a resultant which is combined with the direct current signal output to give a new signal current relatively stable in time position.

2. Apparatus for reducing the effects of multiple wave paths in a frequency shift keying system receptive of frequencies corresponding to mark and space signals comprising a frequency shift receiver, an antenna connected to said frequency shift receiver, said receiver at times receiving said mark and space signals simultaneously because of multiple wave path delay to produce a beat frequency signal which modulates the stronger of the two input signals present, said receiver having a two terminal output, the signal output of said receiver being keyed direct current modulated by any beat frequency signal present to produce a ripple frequency superimposed on the keyed direct current output, said keyed direct current signal varying in position to produce time jumping of the mark and space positions, said direct current signal output having a predetermined signal voltage range, a low pass filter having a two terminal input, a tone keyer coupled to the output of said low pass filter to convert the keyed direct current to corresonding keyed tone, first, second and third impedance matching resistors in series with each other connecting one terminal of the output of the said receiver to one terminal of the input of the said low pass filter, said first and second impedance matching resistors being variable, a ground connection, the remaining output terminal of the said receiver being connected to said ground, the remaining input terminal of the low pass filter being connected to said ground, a ripple passing condenser connected in parallel with the said second impedance matching resistor, said ripple passing condenser having a low reactance to the ripple frequency, a plus limiter diode, said plus limiter diode having an anode and a cathode, said plus limiter diode anode being connected to the junction of said second and third impedance matching resistors, said plus limiter diode cathode being connected to ground, a source of variable negative voltage, a minus limiter diode, said minus limiter diode having an anode and a cathode, said minus limiter diode cathode being connected to said junction of said second and third impedance matching resistors, said minus limiter diode anode being connected to said source of variable negative voltage, a parallel impedance matching resistor connected between the said junction of the said second and third impedance matching resistors and ground to complete the impedance matching network comprising the first, second, and third impedance matching resistors and said parallel impedance matching resistor, said first and second impedance matching resistors being adjusted with respect to the ripple passing condenser so that a substantial portion of the ripple will appear across the plus and minus limiter diodes, said diodes operating to limit the portions of the ripple above and below the predetermined signal voltage range to produce a resultant which is combined with the direct current signal output to give a new signal current relatively stable in time position.

3. Apparatus for reducing the effects of multiple wave paths in a diversity frequency shift keying radio system receptive of frequencies corresponding to mark and space signals comprising a first frequency shift receiver, a second frequency shift receiver, both of said receivers at times receiving said mark and space signals simultaneously because of multiple wave path delay to produce a beat frequency signal which modulates the stronger of the two input signals present, a first antenna connected to said first frequency shift receiver, a second antenna connected to said second frequency shift receiver, said antennas being geographically spaced to provide for diversity reception, a diversity switcher to select the receiver receiving the stronger of the input signals, said diversity switcher having a two-terminal output, the signal output of said diversity switcher being keyed direct current modulated by any beat frequency signal present to produce a ripple frequency superimposed on the keyed direct current output signal, said keyed direct current output signal varying in position to produce time jumping of the mark and space positions, said direct current signal output having a predetermined signal voltage range, a low pass filter having a two-terminal input, a tone keyer coupled to the output of said low pass filter to convert the keyed direct current to corresponding keyed tone, first, second and third impedance matching resistors in series with each other and connecting one terminal of the output of the said diversity switcher to one terminal of the input of the said low pass filter, said first and second impedance matching resistors being variable, a ground connection, the remaining output terminal of the diversity switcher being connected to said ground, the remaining input terminal of the low pass filter being connected to said ground, a ripple passing condenser connected in parallel with the said second impedance matching resistor, said ripple passing condenser having a low reactance to the ripple frequency, a plus limiter diode, said plus limiter diode having an anode and a cathode, said plus limiter diode anode being connected to the junction of said second and third impedance matching resistors, said plus limiter diode cathode being connected to ground, a source of variable negative voltage, a minus limiter diode, said minus limiter diode having an anode and a cathode, said minus limiter diode cathode being connected to said junction of said second and third impedance matching resistors, said minus limiter diode anode being connected to said source of variable negative voltage, a parallel impedance matching resistor connected between the said junction of the said second and third impedance matching resistors and ground to complete the impedance matching network comprising the first, second, and third impedance matching resistors and said parallel impedance matching resistor, said first and second impedance matching resistors being adjusted with respect to the ripple passing condenser so that a substantial portion of the ripple will appear across the plus and minus limiter diodes, operating to limit the portions of the ripple above and below the predetermined signal voltage range to produce a resultant which is combined with the direct current signal output to give a new signal current relatively stable in time position.

4. In a frequency shift telegraph receiver subject to multipath reception of transmitted signals as a result of which carrier frequencies of different values are simultaneously present at the input of such receiver, means for demodulating and limiting the frequency shifted carrier frequency signals to produce keyed direct current telegraph signals having a ripple voltage superimposed thereon as a result of such simultaneous presence of different carrier frequencies, said direct current signals having a predetermined signal voltage range, translating means coupled to receive said direct current signals, an impedance matching network in the coupling to said translating means, said network including two variable resistors connected in series, a pair of diodes each having an anode and a cathode, means connecting the anode of the first diode and the cathode of the second diode to said network, means connecting the cathode of said first diode directly to a point of fixed reference potential, and means connecting the anode of said second diode to a point of adjustable potential negative with respect to said reference potential, said diodes operating to limit the portion of the ripple voltage above and below said signal voltage range to produce a resultant which is added to said direct current signals.

5. In a frequency shift telegraph receiver subject to multipath reception of transmitted signals as a result of which carrier frequencies of different values are simultaneously present at the input of such receiver, means for demodulating and limiting the frequency shifted carrier frequency signals to produce keyed direct current telegraph signals having a ripple voltage superimposed thereon as a result of such simultaneous presence of different carrier frequencies, said direct current signals having a predetermined signal voltage range, translating means coupled to receive said direct current signals, an impedance matching network in the coupling to said translating means, said network including two variable resistors connected in series and including also a capacitor having a low impedance at the ripple voltage frequency connected in parallel with one of said resistors, a pair of diodes each having an anode and a cathode, means connecting the anode of the first diode and the cathode of the second diode to said capacitor on the translating means side thereof, means connecting the cathode of said first diode directly to a point of fixed reference potential, and means connecting the anode of said second diode to a point of adjustable potential negative with respect to said reference potential, said diodes operating to limit the portion of the ripple voltage above and below said signal voltage range to produce a resultant which is added to said direct current signals.

References Cited in the file of this patent

UNITED STATES PATENTS

| | | |
|---|---|---|
| 2,252,380 | Kahn | Aug. 12, 1941 |
| 2,293,835 | Landon | Aug. 25, 1942 |
| 2,383,126 | Hollingsworth | Aug. 21, 1945 |
| 2,385,211 | Konrad | Sept. 18, 1945 |
| 2,414,111 | Lyons | Jan. 14, 1947 |
| 2,415,919 | Thomas | Feb. 18, 1947 |
| 2,504,348 | Peterson | Apr. 18, 1950 |
| 2,514,859 | Griffin et al. | July 11, 1950 |